United States Patent
Even et al.

(10) Patent No.: US 9,558,010 B2
(45) Date of Patent: *Jan. 31, 2017

(54) FAST HOT BOOT OF A COMPUTER SYSTEM

(71) Applicant: INTERNATIONAL BUSINESS MACHINES CORPORATION, Armonk, NY (US)

(72) Inventors: Baruch Even, Netanya (IL); Constantine Gavrilov, Rishon-le-Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 480 days.

This patent is subject to a terminal disclaimer.

(21) Appl. No.: 13/830,153

(22) Filed: Mar. 14, 2013

(65) Prior Publication Data

US 2014/0281454 A1    Sep. 18, 2014

(51) Int. Cl.
*G06F 1/32* (2006.01)
*G06F 9/44* (2006.01)

(52) U.S. Cl.
CPC ............. *G06F 9/4406* (2013.01); *G06F 1/32* (2013.01); *G06F 9/4418* (2013.01)

(58) Field of Classification Search
CPC .............. G06F 1/32; G06F 1/26; G06F 1/28
USPC .............. 713/300, 310, 320, 321, 322, 323, 324,713/330, 340, 375
See application file for complete search history.

(56) References Cited

U.S. PATENT DOCUMENTS

| | | | |
|---|---|---|---|
| 7,516,319 B2 | 4/2009 | Chen | |
| 7,546,449 B2 | 6/2009 | Wu | |
| 7,546,450 B2 | 6/2009 | Danielsen | |
| 7,594,068 B2 | 9/2009 | Diehl | |
| 7,650,490 B2 | 1/2010 | Barron, Jr. et al. | |
| 7,949,814 B2 | 5/2011 | Chan | |
| 2004/0073783 A1 | 4/2004 | Ritchie | |
| 2009/0150598 A1 | 6/2009 | Jung et al. | |
| 2010/0058041 A1 | 3/2010 | John et al. | |
| 2011/0066668 A1* | 3/2011 | Guarraci ........... G06F 17/30233 707/831 |
| 2011/0271088 A1 | 11/2011 | Princen et al. | |
| 2012/0096250 A1* | 4/2012 | Aloni ........................ G06F 8/67 713/2 |
| 2012/0096251 A1* | 4/2012 | Aloni et al. ..................... 713/2 |
| 2012/0096252 A1* | 4/2012 | Arditti et al. .................... 713/2 |

FOREIGN PATENT DOCUMENTS

EP    1764687 A1    3/2007

* cited by examiner

*Primary Examiner* — Phil Nguyen
*Assistant Examiner* — Keshab Pandey
(74) *Attorney, Agent, or Firm* — Griffiths & Seaton PLLC (57) ABSTRACT

Apparatus and computer program products implement embodiments of the present invention that enable a computer that is executing a first operating system kernel to load a second operating system kernel and one or more software components to a region in a memory. Using functions incorporated in the kernel, the region in the memory is tagged, and the computer initiates a boot of a second operating system kernel while preserving in the tagged region contents stored therein. Following the boot of the second operating system kernel, the computer executes the one or more software components from the tagged region that was preserved during the boot.

9 Claims, 7 Drawing Sheets

FAST HOT BOOT OF A COMPUTER SYSTEM

CROSS-REFERENCE TO RELATED APPLICATIONS

This application is related to U.S. patent application Ser. Nos. 13/829,612, 13/829,906, 13/830,019, and 13/830,081, each filed Mar. 14, 2013, and which are incorporated herein by reference.

FIELD OF THE INVENTION

The present invention relates generally to computer systems, and specifically to configuring a computer system to perform a hot boot while preserving software components of a system disk in the computer's memory.

BACKGROUND

Operating systems manage the way software applications utilize the hardware of computer systems, such as storage controllers. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Two common techniques for rebooting (i.e. restarting) a computer and loading an operating system are a "cold boot" and a "warm boot". During a cold boot, power to the computer's system's volatile memory is cycled (i.e., turned off and then turned on), and the operating system is loaded. Since power is cut off to the memory, any contents (i.e., software applications and data) stored in the memory prior to the cold boot are lost. During a warm boot, the computer loads the operating system while power is still applied to the volatile memory, thereby enabling the computer to skip some hardware initializations and resets. Additionally, during a warm boot the memory may be reset.

In addition to a warm boot and a cold boot, the Linux operating system offers a method of rapidly booting a new operating system kernel via the kexec function. The kexec function first loads a new kernel into memory and then immediately starts executing the new kernel. Using kexec to boot a new kernel is referred to a "hot" boot/reboot, since the computer's memory is not reset during the boot.

The description above is presented as a general overview of related art in this field and should not be construed as an admission that any of the information it contains constitutes prior art against the present patent application.

SUMMARY

There is provided, in accordance with an embodiment of the present invention a method, including loading, by a computer executing a first operating system kernel, a second operating system kernel and one or more software components to a region in a memory, tagging the region in the memory, initiating a boot of a second operating system kernel while preserving in the tagged region contents stored therein, and following the boot of the second operating system kernel, executing the one or more software components from the tagged region.

There is also provided, in accordance with an embodiment of the present invention an apparatus, including a memory configured to store a first operating system kernel, and a processor configured to loading a second operating system kernel and one or more software components to a region in the volatile memory, to tag the region in the memory, to initiate a boot of a second operating system kernel while preserving in the tagged region contents stored therein, and following the boot of the second operating system kernel, to access the one or more software components from the tagged region.

There is further provided, in accordance with an embodiment of the present invention a computer program product, the computer program product including a non-transitory computer readable storage medium having computer readable program code embodied therewith, the computer readable program code including computer readable program code configured to, while executing a first operating system kernel, load a second operating system kernel and one or more software components to a region in a memory, computer readable program code configured to tag the region in the memory, computer readable program code configured to initiate a boot of a second operating system kernel while preserving in the tagged region contents stored therein, and computer readable program code configured to access, following the boot of the second operating system kernel, the one or more software components from the tagged region.

BRIEF DESCRIPTION OF THE DRAWINGS

The disclosure is herein described, by way of example only, with reference to the accompanying drawings, wherein.

DETAILED DESCRIPTION OF EMBODIMENTS

While booting, a computer may initially load a boot loader and an operating system kernel. Upon execution, the kernel may load and start executing software components such as services and applications. The software components that a kernel loads during a boot are typically stored in a system startup configuration file. For example, during a boot, a computer configured as a storage controller may load a Linux operating system kernel, a network TCP/IP service and a storage application configured to process storage requests received from one or more host computers.

The collection of software components that the computer loads from a storage device during a boot may be referred to as a system disk. For example, in embedded systems such as storage controllers, the system disk may comprise a collection of software components that the storage controller loads (during a boot) that enables the storage controller to process storage requests.

There may be instances when an administrator (i.e., an individual) needs to upgrade one or more software components executing on a computer system, such as a storage controller. Given the variety of software components executing on a storage controller, it may be sometimes preferable to perform a hot upgrade (i.e., performing the upgrade while the storage controller is in operation) for multiple software components simultaneously (e.g., upgrading an operating system kernel at the same time as upgrading a storage system service). Alternatively, there may be instances when the administrator reboots the computer system without upgrading any of the software components.

Embodiments of the present invention provide methods and systems for rapidly booting a computer system by caching selected components of the system disk to a region of random access memory, and tagging the region in order to preserve contents of the region during a hot boot. As explained hereinbelow, the random access memory may comprise volatile or non-volatile memory. Preserving the identified memory regions enables the storage controller operator to upgrade software applications with minimal interruption to in-flight I/O operations.

In some embodiments, the computer is initially executing a first operating system kernel, and one or more software components, including a second operating system kernel, are loaded to a region in the computer's volatile memory. For example, the software components may comprise one or more services. The region storing the second kernel and the one or more services can be tagged, and upon initiating a boot of the computer system (e.g., via a hot boot), contents of the memory regions can be preserved. Following the boot, the computer can immediately access contents of the preserved region, thereby enabling the computer to be operational within a short period of time following the boot.

As explained hereinbelow, the computer may be configured to execute a disk-based file system such as Ext2, and the preserved memory region can be attached the disk-based file system's cache upon loading and executing the kernel during the hot boot. Alternatively, the computer can be configured to execute a random access memory (RAM) based file system such as ramfs, and the preserved memory region can be attached to the RAM-based file system during the hot boot.

While the embodiments described herein relate generally to a module of a clustered storage controller, it will be understood that embodiments of the present invention may also be used for other types of computer systems.

Figure 1:
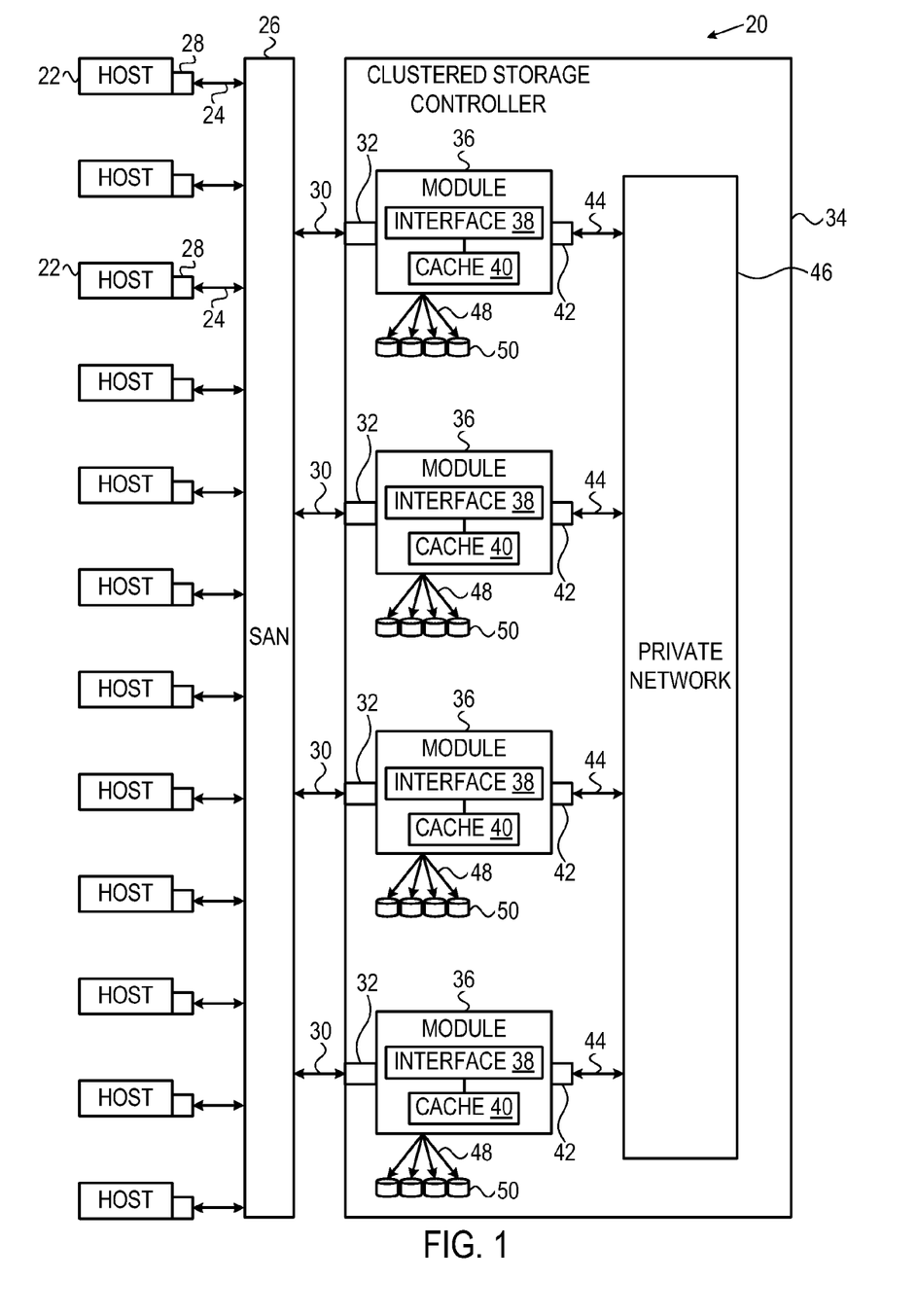
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Hot Boot Using Memory Tagging and Preservation

Figure 2A:
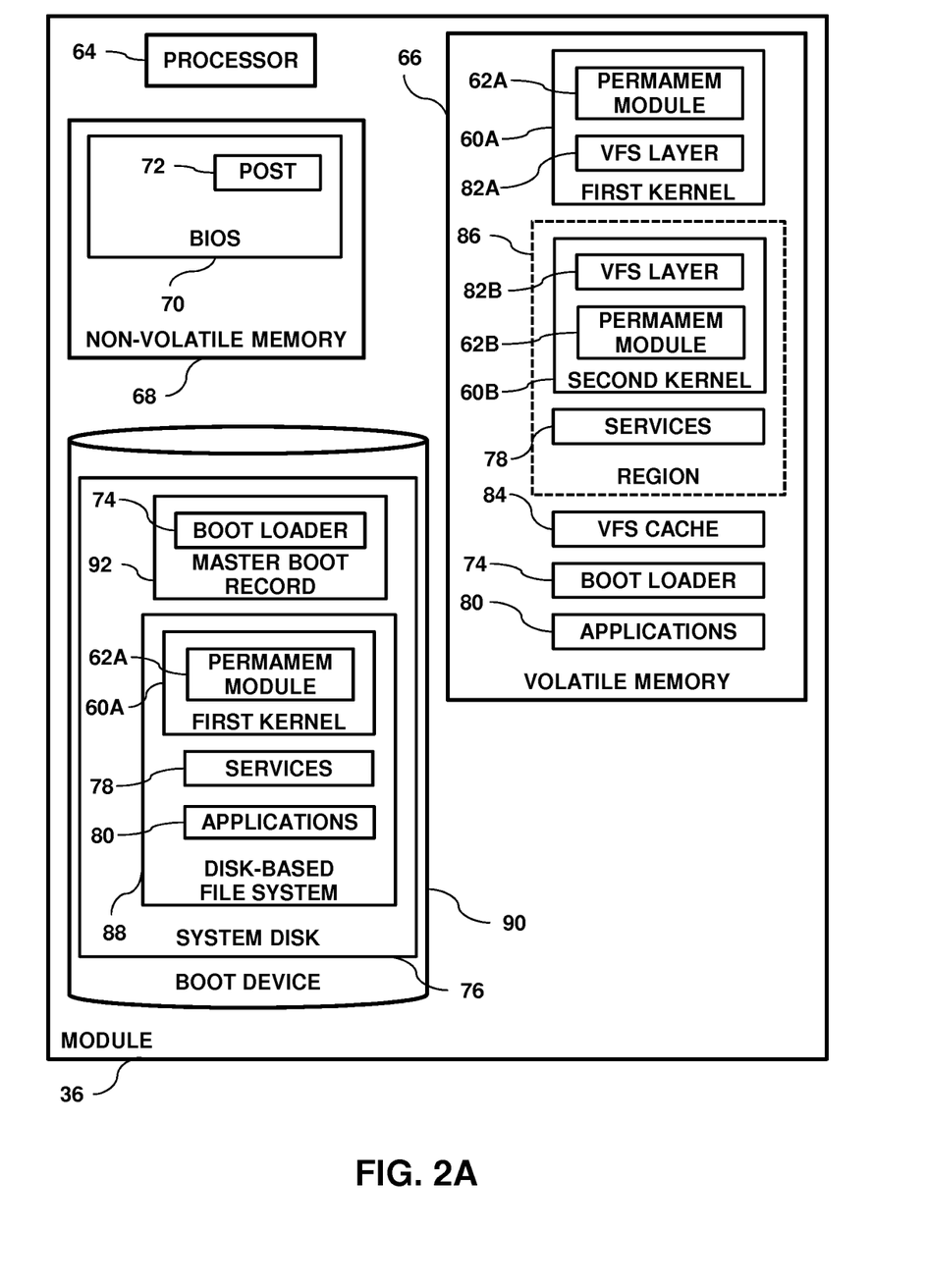
FIG. 2A is a block diagram of a module of the storage system configured to perform a hot boot, in accordance with a first example of an embodiment of the present invention.
Figure 2B:
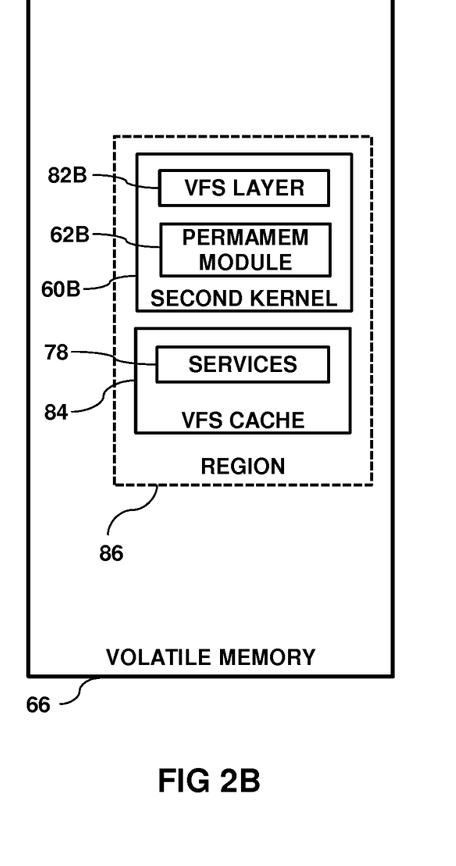
FIG. 2B is a block diagram of a volatile memory of the module configured to perform a hot boot, in accordance with the first example of an embodiment of the present invention.

FIG. 2A is a block diagram of module 36 comprising a volatile memory 66 prior to performing a hot boot of kernel 60B, and FIG. 2B is a block diagram of memory 66 subsequent to performing the hot boot, in accordance with a first example of an embodiment of the present invention. FIGS. 2A and 2B may collectively be referred to as FIG. 2. In the first example shown in FIGS. 2A and 2B, module 36 executes a disk-based file system 88.

In the description herein, kernels 60 and their respective permamem modules 62 and virtual file system (VFS) layers 82 (whose operation is described hereinbelow) may be differentiated by appending a letter to the identifying numeral, so that kernels 60 comprise a first kernel 60A and a second kernel 60B. Alternatively a given kernel 60 may just be referred to kernel 60.

Module 36 comprises a processor 64, volatile memory 66, a non-volatile memory 68, and a boot device 90. Boot device 90 may comprise a storage device such as a hard disk, an optical disk, a flash device (such as Compact Flash, USB stick or SDCard) or a solid state drive (SSD).

As described hereinbelow, processor 64 initially executes a first kernel 60A, and then performs a hot boot of second kernel 60B. In some embodiments, second kernel 60B may comprise an upgraded version of first kernel 60A (i.e., the second kernel is different from the first kernel). In an alternative embodiment, the first and the second kernels may be identical.

Non-volatile memory 68 comprises a BIOS 70 configured to store power-on self-test (POST) procedures 72. When power is cycled to module 36, processor 64 can be configured to execute POST procedures 72, which loads a boot loader 74 to memory 66. In the example shown in FIG. 2, storage device 50 is configured as a boot device for module 36, and POST procedures 72 can be configured to load (and start executing) boot loader 74 from boot device 90.

Boot device 90 comprises a system disk 76 that comprises disk-based file system 88 and a master boot record 92 that is configured to store boot loader 74. Examples of disk-based file systems for the Linux operating system include the second extended file system (Ext2), the third extended file system (Ext3) and the fourth extended file system (Ext4). Disk-based file system 88 is typically stored on one or more regions (not shown) of boot device 90.

Disk-based file system 88 comprises first kernel 60A, one or more services 78 and one or more applications 80. In operation, boot loader 74 is configured to load kernel 60A to memory 66 and (upon execution) kernel 60A may be configured to load services 78 and applications 80 to the volatile memory.

Kernel 60 also comprises virtual file system (VFS) layer 82 comprising a VFS cache 84. In operation, VFS layer 82 specifies an interface between a given kernel 60 and a "concrete" file system (not shown), such as Ext2. VFS layer 82 enables applications 80 and kernel 60 to randomly access files stored on a given storage device 50. In operation, VFS layer 82 mandates that all reads to and writes from a given file system are performed via VFS cache 84.

For example, when processing a read request, VFS layer 82 checks if the requested data is in the VFS cache 84. If blocks storing the requested data are found in VFS cache 84, the read operation is quick and non-blocking (i.e., since the requested data is immediately available from the VFS cache). However, if the blocks storing the requested data are not found in VFS cache 84, the VFS layer can schedule a read request to a given storage device 50 that has the requested data, and the read operation will block (i.e., wait) until the read request to the given storage device completes by loading the requested blocks to the VFS cache.

Processor 64 may also perform write operations via the VFS cache. Typically a write operation completes from the application perspective when a page of memory is updated in VFS cache 84. Updated VFS cache pages (marked as "dirty") can then be written in the background to the storage device.

Additionally, since processor 64 executes services 78 and applications 80 by first reading the relevant executable files, blocks storing the services and the application typically need to be present in VFS cache 84 prior to execution. Therefore, upon booting kernel 60, if VFS cache 84 stores services 78 and applications 80, their startup time will be fast, since processor 64 can access the software components directly from that module's random access memory. However, if VFS cache 84 does not contain (the files of) services 78 and applications 80, their startup will be slower, since execution of the software components may require multiple reads from storage device 50 (which is typically slower than random access memory).

In the embodiments described herein, processor 64 may exclude a region 86 (or any other tagged region in memory 66) from being reset during a hot boot of module 36. For example, a region 86 can be tagged with a specific name (e.g. "services") before booting the second kernel. When processor 64 boots the second kernel 60B, the second kernel can reserve all tagged memory regions, in order to prevent the tagged memory regions from being reset or used by new memory allocations. Therefore, upon booting the second kernel, address ranges of the tagged regions (e.g. region 86) can be preserved in the module's random access memory (e.g., volatile memory 66).

In some embodiments, applications 88 or kernel 60 can attach to a specific tagged region 86 by passing a name parameter (e.g. "services") to permamem module 62. Using permamem module 62 to tag and preserve memory region 86 is described in U.S. Patent Application 2012/0246456 A1, whose disclosure is incorporated herein by reference.

In the example shown in FIG. 2A (i.e., prior to the hot boot), processor 64 stores second kernel and services 78 to region 86, tags the region and performs a hot boot (e.g., using kexec). As shown in FIG. 2A, upon booting second kernel 60B, processor 66 populates VFS cache 84 with services 78 by configuring the VFS cache to "attach" the portion of region 86 storing the services. Embodiments of the present invention enable second kernel 60B to read services 78 and applications 80 directly from VFS cache 84 (i.e., without the need to perform read operations from the boot device), thereby significantly decreasing boot time.

In alternative BIOS embodiments, BIOS 70 can be configured to perform the fast boot method described in FIGS. 2A and 2B as follows (i.e., as opposed to using a function call such as kexec):

In a first alternative BIOS embodiment, region 86 includes second kernel 60B and services 78. Processor 64 can call a first function in BIOS 70 to configure POST procedures 72 to preserve region 86 upon the next reset of the processor, and call a second function in the BIOS to configure the POST procedures to boot the second kernel from its location in the random access memory upon completing POST. Upon resetting processor 64, the processor can execute the POST procedures. In this first BIOS embodiment, the POST can be configured to preserve memory region 86 and to load the second kernel from the preserved region. Once booted, the second kernel can invoke the permamem module to reserve the memory region 86 and to populate VFS cache from region 86.

In a second alternative BIOS embodiment, region 86 can include services 78. In the event kernel 60A needs to be updated, first kernel 60A may be updated on the file system of the boot device, and the boot loader can be configured to boot the updated kernel. Once kernel 60A is updated, processor 64 can call a first function in BIOS 70 to configure POST procedures to preserve region 86 upon next reset. Upon resetting processor 64, the POST procedures can be executed. In this second alternative BIOS embodiment, the POST is configured to preserve memory region 86. Upon completing POST, processor 64 executes the boot loader from the boot device. The boot loader can then boot the second kernel that utilizes permamem module 62B to reserve (i.e., tag) memory region 86 and populate the VFS cache from reserved memory region 86. Booting the second kernel from boot device (as opposed to booting it from random access memory) typically does not result in a significant delay since the kernel size is relatively small compared to the size of the applications.

Figure 3A:
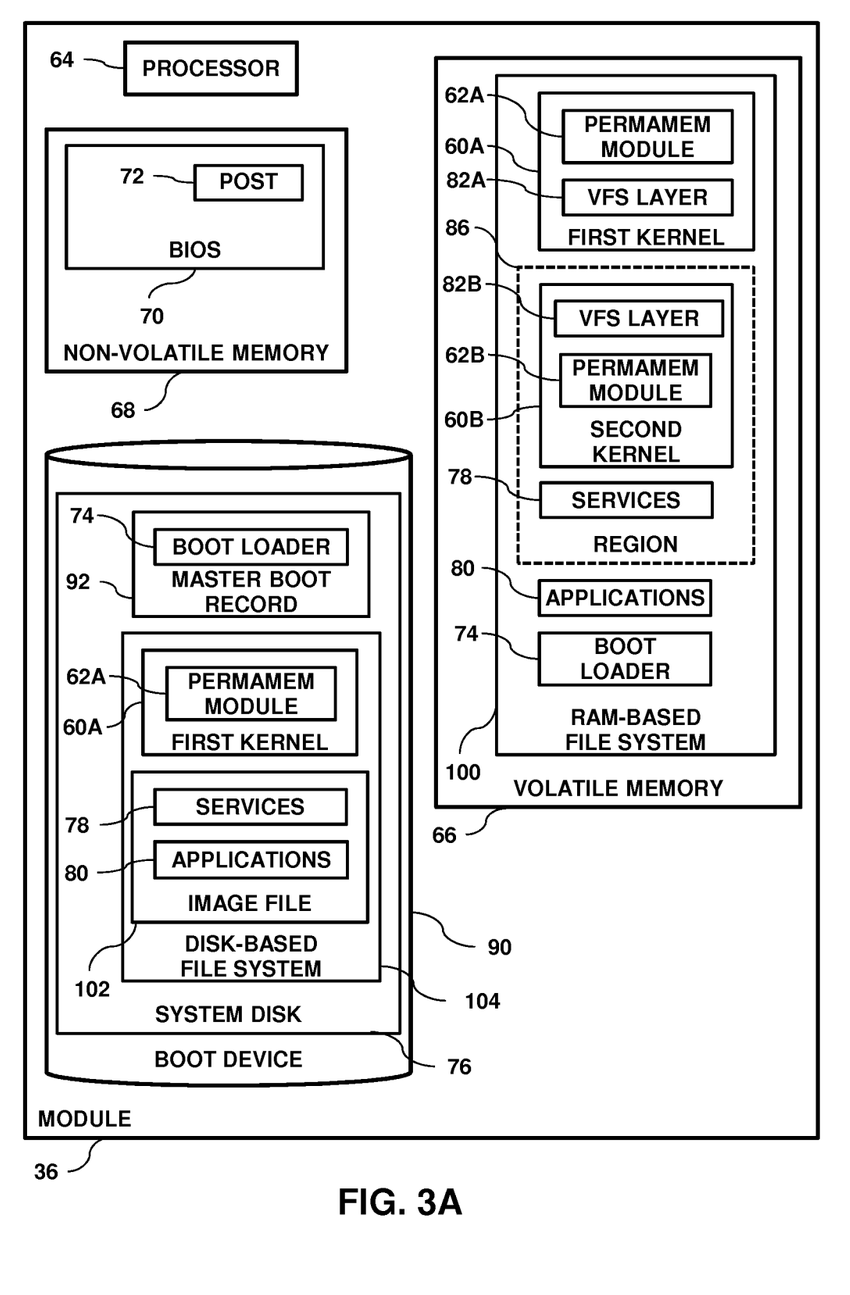
FIG. 3A is a block diagram of the module configured to perform a hot boot, in accordance with a second example of an embodiment of the present invention.
Figure 3B:
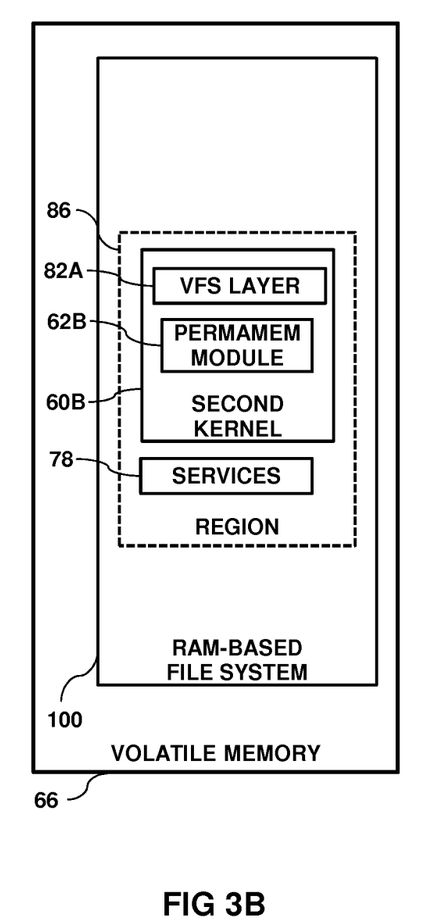
FIG. 3B is a block diagram of the volatile memory of the module configured to perform a hot boot, in accordance with the second example of an embodiment of the present invention.

FIG. 3A is a block diagram of module 36 prior to performing a hot boot of kernel 60B, and FIG. 3B is a block diagram of memory 66 subsequent to performing the hot boot, in accordance with a second example of an embodiment of the present invention. FIGS. 3A and 3B may collectively be referred to as FIG. 3. In the second example shown in FIGS. 3A and 3B, module 36 executes a random access memory (RAM) based file system 100. In RAM-based file systems such as ramfs, VFS layer may store data solely in volatile memory 66 (i.e., data written to ramfs typically remains in the volatile memory and not destaged to storage device 50).

Typically, RAM based file system 100 (e.g., ramfs) is populated from an image file 102 (also referred to herein as a ramfs image) that is stored in a disk-based file system 104 on boot device 90. In the configuration shown in FIG. 3A, boot device 90 comprises boot loader 74 and disk-based file system 104, the disk-based file system comprises first kernel 60A and image file 102, and the image file comprises services 78 and applications 80. In operation, boot loader 64 is configured to load kernel 60A and image file 102 to the random access memory (i.e., volatile memory 66 in the configuration shown in FIG. 3A), and then boot the first kernel. Kernel 60A can be configured to use the loaded image file 102 as an instance of RAM-based file system (e.g., ramfs) 100.

In the example shown in FIG. 3A (i.e., prior to a hot boot), processor 64 stores second kernel and services 78 to region 86, tags the region, and performs a hot boot (e.g., using kexec). As shown in FIG. 2A, upon booting second kernel 60B, processor 66 populates RAM-based file system 100 with kernel 60B and services 78 by configuring the RAM-based file system cache to "attach" the portion of region 86 storing the second kernel and the services. Embodiments of the present invention enable second kernel 60B to populate a RAM based file system (e.g., ramfs) instance 100 from the random access memory of module 36 (as opposed to performing slow read operations to load the ramfs image file from boot device 90), thereby decreasing boot speed significantly.

Figure 4:
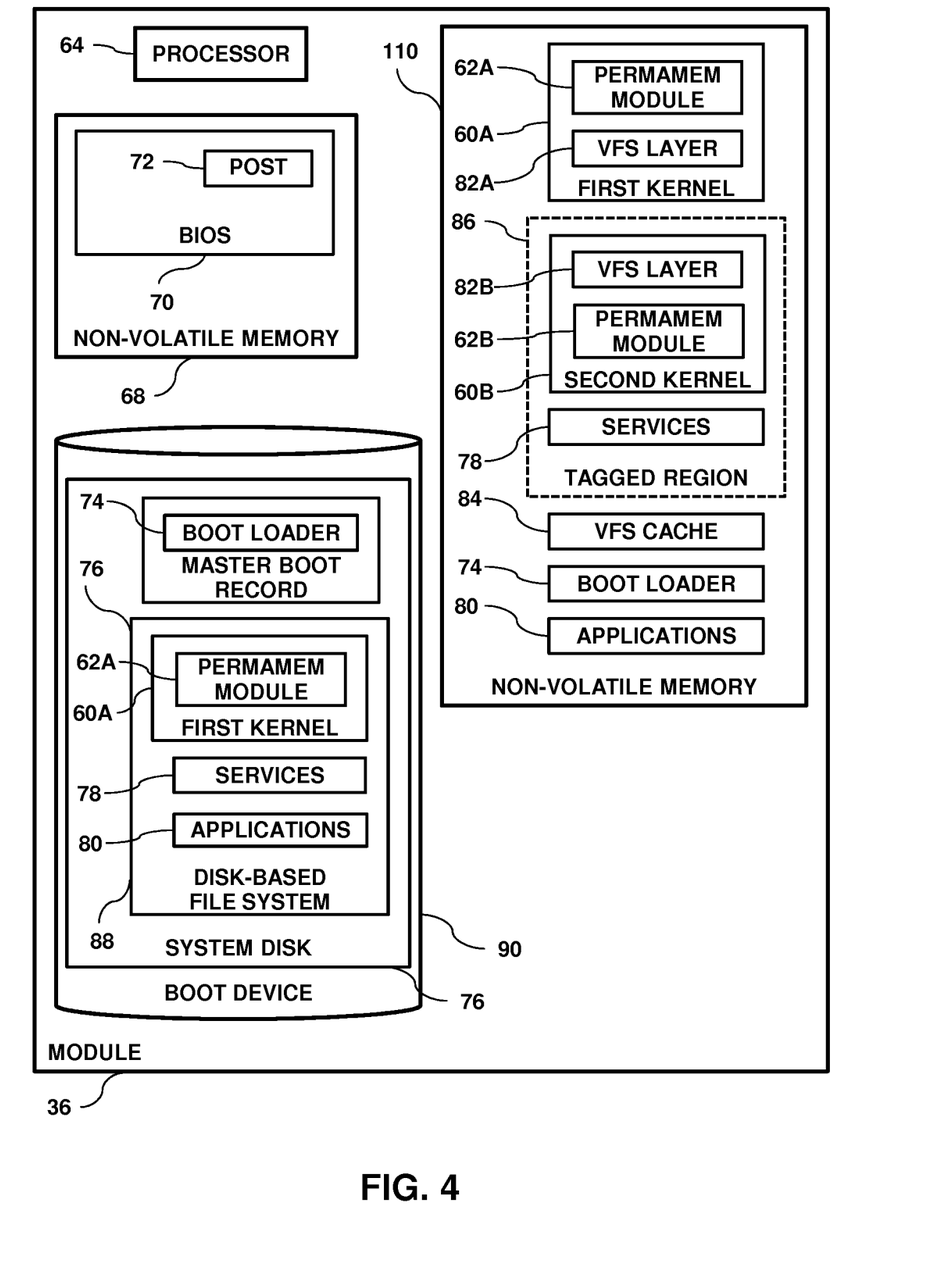
FIG. 4 is a block diagram of the module configured to perform a hot boot, in accordance with a third example of an embodiment of the present invention.

FIG. 4 is a block diagram of module 36 configured to perform a hot boot, in accordance with a third example of an embodiment of the present invention. In the configuration shown in FIG. 4, module 36 comprises a non-volatile random access memory (NVRAM) 110 (i.e., instead of volatile memory 66). In operation, contents of NVRAM 110 are preserved during cold, warm and hot boots of module 36. Therefore, embodiments described in FIGS. 2A, 2B, 3A and 3B hereinabove may be adapted to tag region 86 in NVRAM 110.

In the configuration shown in FIGS. 2 and 3, module 36 comprises volatile memory 66, and in the configuration shown in FIG. 4, the module comprises non-volatile memory 110. In the embodiments described herein, processor 64 tags region 86 in a random access memory that may comprise either volatile memory 66 or non-volatile memory 110. Additionally, both volatile memory and non-volatile memory 110 may be referred to herein as random access memory.

Processor 60 typically comprises a general-purpose central processing unit (CPU), which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 60 may be carried out by dedicated or programmable digital hardware components, or using a combination of hardware and software elements.

While the embodiments describe herein have system disk 76 comprising boot loader 74, first kernel 60A, services 78 and applications 80, any organized collection comprising any number of components is considered to be within the spirit and scope of the present invention. Additionally, while the examples shown in FIGS. 2-4 shows tagged region 86 comprising second kernel 60B and services 78, any number of components from system disk 76 stored in the tagged region are considered to be within the spirit and scope of the present invention.

Figure 5:
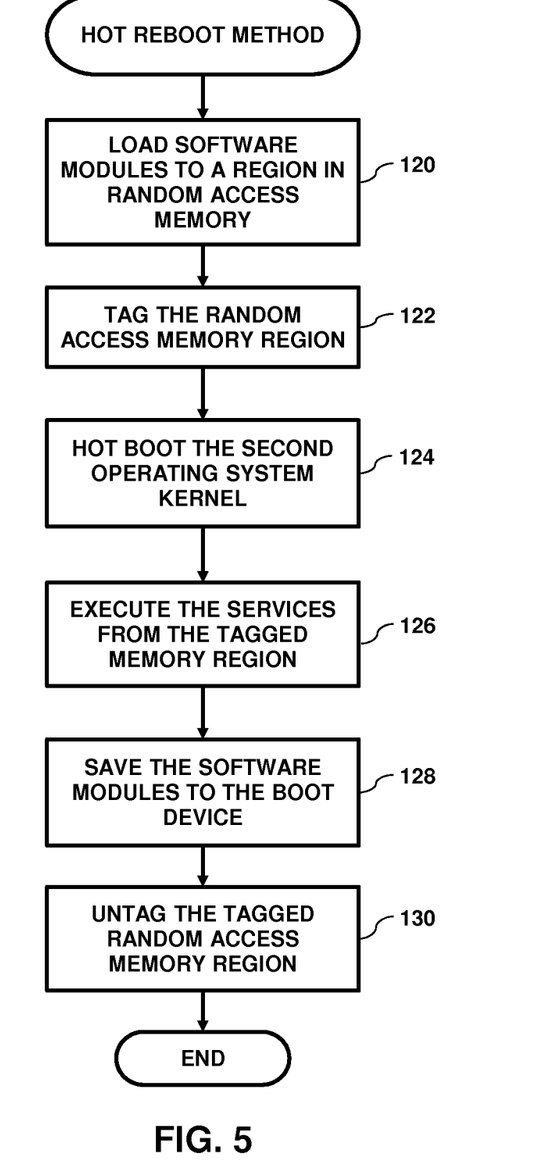
FIG. 5 is a flow diagram that schematically illustrates a method of performing a hot boot, in accordance with an embodiment of the present invention.

FIG. 5 is a flow diagram that schematically illustrates a method of performing a hot reboot of module 36, in accordance with an embodiment of the present invention. In the embodiments described herein, processor 64 is initially executing first kernel 60A. Additionally, module 36 may comprise an embedded system that upon booting (either cold, warm or hot) is configured to automatically load services 78.

In an initial step 120, processor 64 loads second kernel 60B and services 78 to the random access memory of module 36 (i.e., memory 66 or memory 110, depending on the configuration. In some load embodiments, processor may retrieve the second kernel and the services from storage device 50 and store the retrieved software components to memory 66. In an alternative load embodiment, processor 64 may receive the second kernel and the services from a given host computer 12 via SAN 26.

In a tag step 122, processor 64 calls functions in permamem module 62A or BIOS 70 to tag random access memory region 86, and in a boot step 124, processor 64 performs a boot (i.e., starts executing) of second kernel 60B while preserving the contents (i.e., any software components and/or data) currently stored in tagged region 86.

In some boot embodiments, processor 64 can call a software function such as kexec to start executing second kernel 60B. In an alternative boot embodiment, BIOS 70 can be configured to start executing second kernel 60B directly from a specific address in memory 66. For example, processor 64 may load second kernel 60B and services 78 to region 86 (i.e., the specific memory region described supra), call a tagging function in BIOS 70 to tag the region, and call a "hot" boot function in the BIOS to start executing second kernel 60B from memory 66.

In additional boot embodiments, BIOS 70 can be configured to preserve region 86 during a warm boot, load boot loader 74 and second kernel 60B from boot device 90. Second kernel 60B can then execute services 78 directly from the tagged (i.e., preserved) region. In further boot embodiments, as shown in FIG. 4, module 36 may comprise NVRAM 110, and BIOS 70 can be configured to not reset the NVRAM (or tagged region 86) during a boot.

In an execution step 126, processor 64 executes services 78 from tagged region 86. Since services 78 were retained in memory during the boot, processor 64 can populate VFS cache 84 (as shown in FIG. 2) or RAM-based file system 100 (as shown in FIG. 4) such as ramfs without accessing boot device 90. Therefore, embodiments of the present invention can enable module 36 to complete the boot operation quickly.

In a save step 128, processor 64 saves second kernel 60B (and any updated services 78 and applications 80) to boot device 90. Saving kernel 60B to boot device 90 is described in more detail in U.S. patent application "Live Initialization of a Boot Device", referenced above.

Finally, in an untag step 130, processor 64 untags region 86 (i.e., the tagged random access memory region), and the method ends. By untagging region 86, contents of the region will not be preserved in the event of a subsequent hot boot. To start executing applications 80 (e.g., configuration and diagnostic applications), processor 64 can load the applications from storage device 50.

In some embodiments, memory 66 may be segregated into a kernel space and a user space. The user space is typically a region in memory 66 configured for running user applications, while the kernel space is typically reserved for running the kernel and extensions to the kernel. In the embodiments described herein, upon processor 64 performing the boot and the populate steps from the kernel space, the processor can hand control to the user space.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
a memory configured to store a first operating system kernel; and
a processor configured to load a second operating system kernel and one or more software components to a region in the memory, to tag the region in the memory, to initiate a boot of a second operating system kernel while preserving in the tagged region contents stored therein, and following the boot of the second operating system kernel, to access the one or more software components from the tagged region;
wherein the one or more software components are selected from a list comprising a boot loader, a service and a software application, and wherein the processor is configured to execute the one or more software components by populating a virtual file system (VFS) cache of a disk-based the system with the tagged region, and executing the one or more software components from the VFS cache.

2. The apparatus according to claim 1, wherein the processor is configured to execute the one or more software components comprises populating a random access memory (RAM) based the system with the tagged region, and executing the one or more software components from the RAM based file system.

3. The apparatus according to claim 1, wherein subsequent to initiating the boot of the second operating system kernel, the processor is configured to save the second operating system kernel to a boot device.

4. The apparatus according to claim 3, wherein subsequent to executing the one or more software components, the processor is configured to save the one or more software components to the boot device.

5. The apparatus according to claim 1, wherein the processor is configured to untag the region in the volatile memory subsequent to executing the one or more software components.

6. The apparatus according to claim 1, wherein the memory comprises a random access memory selected from a list comprising a volatile memory and a non-volatile random access memory.

7. The apparatus according to claim 1, wherein the processor is configured to tag the region by calling a function in a basic input output system (BIOS) to preserve the region during the boot.

8. A computer program product, the computer program product comprising: a non-transitory computer readable storage medium having computer readable program code, executed by a processor, embodied therewith, the computer readable program code comprising:
computer readable program code configured to, while executing a first operating system kernel, load a second operating system kernel and one or more software components to a region in a memory;

computer readable program code configured to tag the region in the memory; computer readable program code configured to initiate a boot of a second operating system kernel while preserving in the tagged region contents stored therein; and computer readable program code configured to access, following the boot of the second operating system kernel, the one or more software components from the tagged region;

wherein the one or more software components are selected from a list comprising a boot loader, a service and a software application, and wherein the processor is configured to execute the one or more software components by populating a virtual file system (VFS) cache of a disk-based the system with the tagged region, and executing the one or more software components from the VFS cache.

9. The computer program product according to claim 8, wherein the memory comprises a random access memory selected from a list comprising a volatile memory and a non-volatile random access memory.

* * * * *